April 15, 1952  V. C. ANDERSON  2,593,084
ADJUSTABLE APRON FEEDER
Filed Feb. 9, 1949  2 SHEETS—SHEET 1
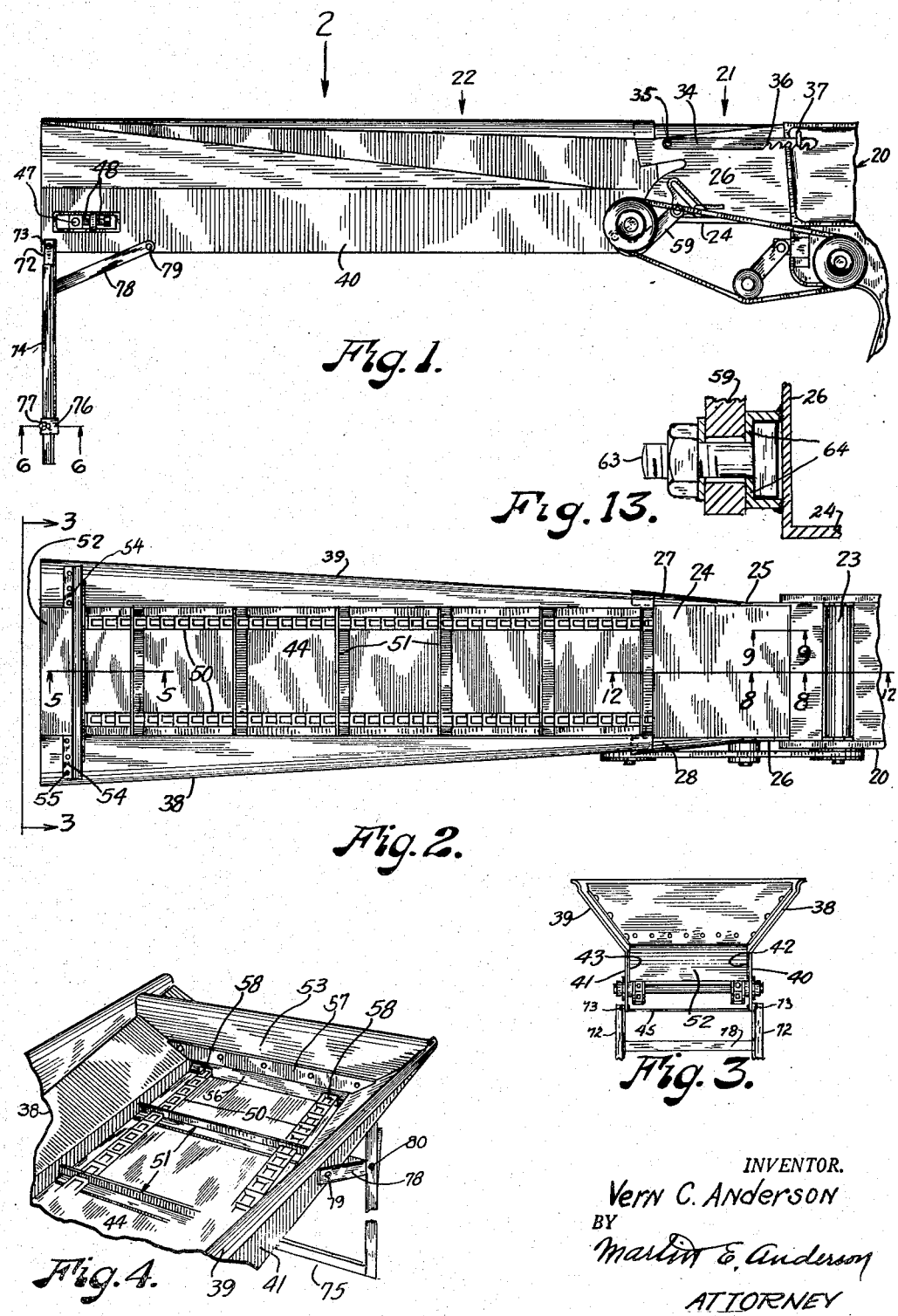
INVENTOR.
Vern C. Anderson
BY
Martin E. Anderson
ATTORNEY April 15, 1952  V. C. ANDERSON  2,593,084
ADJUSTABLE APRON FEEDER
Filed Feb. 9, 1949  2 SHEETS—SHEET 2
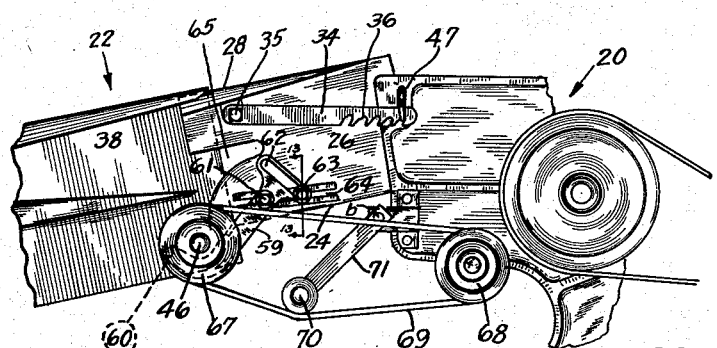
Fig. 7.
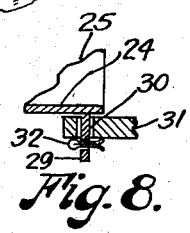
Fig. 8.
Fig. 9.
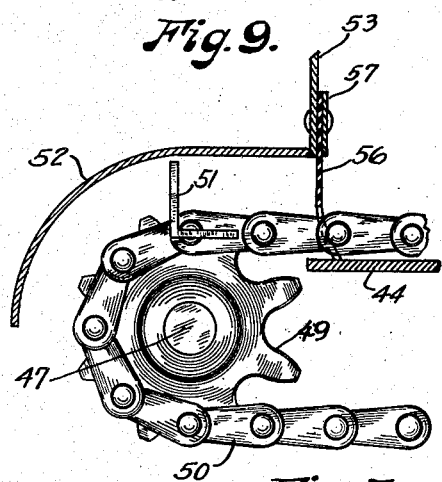
Fig. 5.
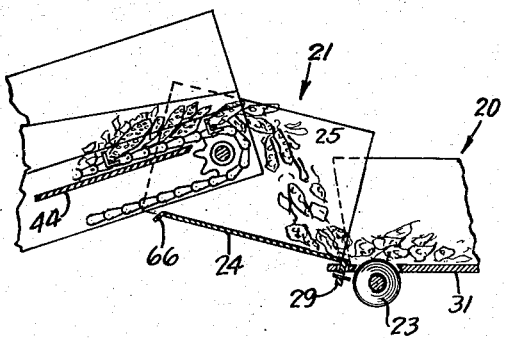
Fig. 12.
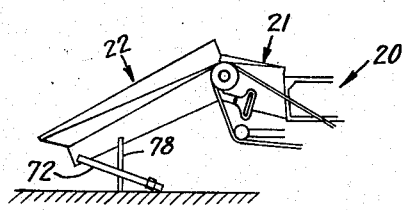
Fig. 10.
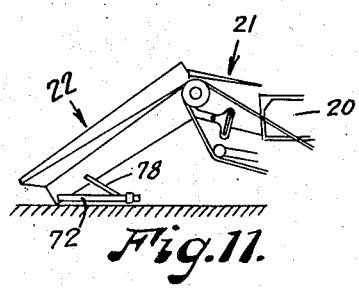
Fig. 11.
Fig. 6.
INVENTOR.
Vern C. Anderson
BY
Martin E. Anderson
ATTORNEY Patented Apr. 15, 1952

2,593,084

UNITED STATES PATENT OFFICE 2,593,084

ADJUSTABLE APRON FEEDER

Vern C. Anderson, Hastings, Nebr.

Application February 9, 1949, Serial No. 75,394

2 Claims. (Cl. 241—301)

This invention relates to feed grinders and more particularly to improvements in an adjustable apron feeder comprising a conveyor and chute for delivering materials to the grinder.

One of the principal objects of the invention is to provide a feeder which may be adjusted to various positions relative to a grinder so that it is sufficiently versatile to feed all types of material to be ground and also to dispose the loading or receiving end of the conveyor in an optimum position relative to the locus of the supply of material.

Another object is to provide a conveyor and chute which are adjustable relative to each other, each being adjustable relative to a grinder.

Another object is to provide a conveyor which will deliver material to a chute without spillage from the conveyor system.

Another object is to provide a power drive transmission between a grinder and conveyor which will drive the conveyor in all positions of adjustment thereof relative to the grinder.

Another object is to provide a novel dam for the receiving end of the conveyor which will prevent loss of small grain or other material.

Another object is to provide a novel supporting leg construction for the receiving end of the conveyor which permits a wide range of angular adjustment of the conveyor relative to the grinder.

Another object is to provide a feeder construction which is simple in construction and subject to economical manufacture.

Still further objects, advantages, and salient features will become more apparent from a consideration of the description to follow, the appended claims, and the accompanying drawing, in which:

Figure 1 is a side elevation of the apron feeder and chute in one position of adjustment relative to a feed grinder, a fragment of the latter being shown at the right;

Figure 2 is a top plan thereof, in the direction of arrow 2, Figure 1;

Figure 3 is an end elevation taken on line 3—3, Figure 2;

Figure 4 is a top perspective of the rear or receiving end of the feeder;

Figure 5 is an enlarged section taken on line 5—5 Figure 2;

Figure 6 is an enlarged section taken on line 6—6, Figure 1;

Figure 7 is an enlarged side elevation of a portion of the device shown in Figure 1, the parts being shown in another position of adjustment;

Figure 8 is a section taken on line 8—8, Figure 2;

Figure 9 is a section taken on line 9—9, Figure 2;

Figure 10 is a side elevation similar to Figure 1, to reduced scale, showing one of the various positions of adjustment;

Figure 11 is a similar view showing another position of adjustment;

Figure 12 is a vertical section taken through line 12—12, Figure 2, showing the various parts in one of the positions of adjustment; and Figure 13 is a section taken on line 13—13, Figure 7.

Referring in detail to the drawing, and particularly to Figures 1 to 4, there is shown a feed grinder 20 to which is affixed an apron feeder comprising a chute 21 and a feed conveyor 22. The grinder includes a feed roll 23 and any other feed devices which cooperate with it to feed material to the grinder elements of the machine. Since the grinder is conventional and the subject of the invention may be used with different types of grinders, only a fragment of the grinder has been shown in the interests of clarity, this element per se comprising no part of the invention and being well known in the art.

The chute is channel shaped, having a floor 24 and side walls 25, 26, the latter having curled upper edges 27, 28. A lug 29 (see Fig. 8) projects downwardly from the chute floor through an aperture 30 in the floor 31 of the grinder. This lug fits the aperture loosely which permits the chute to pivot about the rear edge of floor 31. A cotter key 32 extends through the lug and secures the chute to the grinder. A pair of lugs 33, one of which is shown in Figure 9, engages the rear edge of floor 31, one of each side of lug 29, and steady the chute against movement in a horizontal plane. To secure the chute in a desired position of adjustment, a pair of bars 34 is provided, one on each side of the chute, the rear ends being pivotally secured at 35 to the chute side walls and the front ends each having a set of notches 36 which engage a loop shaped member 37 provided on each side of the grinder. If it is desired to raise the chute, the rear end is merely lifted, and bars 34 will slide forwardly through loops 37 and the loops will enter one of the notches, thus securing the chute against retrograde movement. When it is desired to lower the chute, the bars 34 are lifted slightly and the chute lowered to a desired position after which the bars are dropped with the loops engaging a different notch.

The conveyor comprises sheet metal side walls 38, 39, which have lower portions 40, 41 (Fig. 3), disposed in parallel relation. These portions are secured to downwardly extending flanges 42, 43, on floor 44 of the conveyor. A plurality of cross braces 45 (Fig. 3) join the lower edges of the structure just described, these being spaced along the length of the feeder.

A shaft 46 is journaled in suitable bearings on each side wall of the conveyor at the front end thereof. A similar shaft 47 is journaled in adjustable bearings 48 adjacent the rear end of the conveyor. Each of these carries a pair of sprockets, such as sprocket 49 (Fig. 5), about which chains 50 are trained. Angle iron cross bars 51 are welded to the chains at spaced intervals, as best shown in Figures 2 and 4, which slide along floor 44 as they move along their upper flight.

At the rear or receiving end of the conveyor, a curved guard member 52 extends between the side walls of the conveyor and forwardly thereof covering the conveyor chains and cross bars secured thereto. A removable dam 53 extends between the side walls of the conveyor, being secured thereto by flanges 54 and screws 55. A flexible strip of material 56 such as rubber or fabric reinforced rubber, is secured to a face of the dam by a suitable metal strip 57 secured to the dam. The strip or gate 56 has cut-outs 58 through which the chains pass. When a cross bar or slat 51 engages the gate, it opens it as it passes thereunder after which the gate automatically closes.

The rear end of the conveyor is adjustably secured to the front of the chute by a construction to now be described. At each side of the conveyor an arm 59 is pivotally secured to a side wall thereof by a bolt 60, this arm being curved, to pass beneath shaft 46. The front end of this arm is apertured to receive a bolt 61 and also is slotted at 62 to receive a bolt 63. The heads of the bolts slide in a suitable undercut guide 64 (see Figs. 7 and 13) and when these bolts are tightened, the conveyor and chute are secured in fixed relation.

The side walls of the chute have cut-outs or slots 65, the lower edges of which curve upwardly and forwardly. These provide clearance for the front shaft bearings or the shaft so that the conveyor may be moved upwardly and forwardly. Figure 7 illustrates a position in which the floors of the conveyor and chute are so related that the floor of the chute forms a continuation of the floor of the conveyor, the ends of the floors substantially abutting. Figure 12 illustrates a position in which the conveyor has been moved upwardly and forwardly in slots 65. It will be noted that the front or delivery end of the conveyor now overlaps the floor of the chute so that material will not spill over rear edge 66 of the chute. It will, of course, be understood that arms 59 may secure the chute and feeder in any intermediate position between those shown in Figures 7 and 12.

The conveyor is driven by a pulley 67 secured to shaft 46; a pulley 68 driven by a grinder conveyor roll, or other source of power take-off, and a belt 69 trained over these pulleys. To compensate for the change in the distance of the belt flight when the conveyor and chute are adjusted to a new position, an idler pulley 70 mounted on an arm 71 is provided. One end of this arm is pivoted to the grinder and is swung to a position to tension the belt, or remove slack therefrom, after which it is locked in position by any suitable means, such as the bolt b which secures it to the grinder.

The rear or receiving end of the conveyor is adjustably supported by a leg construction which will now be described. As shown in Figures 1, 4, and 6, a pair of angle iron legs 72 are each pivoted to the conveyor at their upper ends by bolts 73, as shown in Figure 1, the leg on the opposite side being identical. Within legs 72 another pair of legs 74 are slidably arranged, as best shown in Figure 6, the latter being joined together at their lower ends by an angle iron cross member 75. A loop 76 is welded to each leg 72 and threadedly carries a set screw 77. When the rear end of the conveyor has been moved to a desired elevation, the set screws are tightened maintaining it thereat. A U-shaped brace 78 of strap metal has its ends 79 bolted to the sides of the conveyor and bolts 80 extend through intermediate portions of the legs of the U and legs 72. When the conveyor is somewhere near horizontal bolts 80 are in place and brace 78 retains the legs substantially perpendicular to the conveyor. When it is desired to position the receiving end of the conveyor lower than would be possible with the telescopic leg construction described, bolts 80 are removed and legs 72, 74, swing forward as shown in Figure 10, the delivery end of the conveyor now being supported by brace 78 which now becomes the leg of the conveyor. If it is desired to rest the receiving end of the conveyor on the ground or floor, brace, or leg 78 is merely swung forward as shown in Figure 11. The leg construction just described permits the conveyor to be adjusted, as desired, from positions above horizontal to positions below the horizontal, and to the ground or floor.

Having described in detail the construction of the machine, the utility of the various parts and its manner of use will now be set forth. If it is desired to feed hay or roughage to the grinder or mill, the dam may be removed and the conveyor and chute adjusted to a substantially level position, as shown in Figure 1. If it is desired to feed ear corn, the dam is secured in position and the rear end adjusted as shown in Figure 11 adjacent the corn crib. In this position very little scooping is necessary and the gate 53 prevents leakage of grain behind the dam. If a slightly higher position is desired, it may be disposed as shown in Figure 10. If it is desired to elevate the receiving end to wagon or truck bed height, the legs may be adjusted accordingly, it being apparent that the receiving end may be elevated above horizontal. The conveyor effectively conveys green, wet, and dry fodder, hay of all kinds, ear or snapped corn, and all kinds of small grain. When feeding the latter, especially, the overlap of the conveyor and chute as shown in Figure 12 is especially important since spillage of grain over edge 66 is minimized. The gate on the dam, of course, prevents grain leakage at the receiving end of the conveyor. It is also to be observed (see Fig. 2) that the portions of side walls above the floor of the conveyor converge from the receiving end toward the delivery end. The widening at the receiving end facilitates loading since it provides a greater width into which material may be delivered without the necessity of widening the conveyor floor.

Having described the invention what is claimed as new is:

1. A feeding and grinding device comprising;

a feed grinder provided at its front end with a receiver having a substantially horizontal floor and upstanding sidewalls at the sides thereof for receiving feed, an endless conveyor having a floor and side walls, a chute having a floor and side walls, interposed, respectively, between the floors of the conveyor and the receiver of the feed grinder and between the side walls of the latter, means pivotally connecting the front end of the chute to the rear end of the feed grinder receiver for movement in a vertical plane, means for securing together the rear end of the chute and the front end of the conveyor in various relative positions, one of said positions being with the floors of the grinder, receiver, chute, and conveyor disposed in substantially the same plane, and another position wherein the rear end of the conveyor floor is spaced above and overlapping the chute floor, and means for securing the parts in adjusted position.

2. In a material treating device, a material receiver having a substantially horizontal floor for receiving material thereon, said floor having an aperture therein adjacent its rear edge, a chute having a floor and side walls, the floor of the chute forming a continuation of the receiver floor and having a downwardly projecting lug at its front end extending through the aperture, means securing the lug to the receiver, other lugs on the chute floor engaging the front edge of the receiver floor, an endless conveyor disposed at the rear of the chute, curved slots in the side walls of the chute to permit the front end of the conveyor to be moved upwardly and forwardly relative to the chute, an arm pivotally secured at an end thereof to the conveyor, at each side of the latter, each arm having a slot at its other end, T-slot means on each side wall of the chute, extending longitudinally thereof, bolt means extending through each arm slot and engaging its corresponding T-slot means, other bolt means extending through a mid-portion of each arm and engaging its corresponding T-slot means, bars pivotally secured at one end to the top rear end of each side wall of the chute, a plurality of notches near the front end of each bar, loop means on the receiver through which the bars extend and with which a notch may engage to secure the front end of the chute in a desired position of vertical adjustment, a pulley rotatably mounted on the receiver in a position out of line with the chute lugs, a pulley secured to a rotatable part of the conveyor, a belt trained over the pulleys, and means for removing slack from the belt in all positions of adjustment of the chute or conveyor relative to the receiver including an idler pulley pivotally mounted on the receiver engaging the inner surface of the belt.

VERN C. ANDERSON.

REFERENCES CITED

The following references are of record in the file of this patent:

UNITED STATES PATENTS

| Number | Name | Date |
|---|---|---|
| 52,230 | Walker | Jan. 23, 1866 |
| 147,468 | Bailey | Feb. 17, 1874 |
| 215,510 | Davis | May 20, 1879 |
| 215,818 | Hough | May 27, 1879 |
| 264,311 | Maloy | Sept. 12, 1882 |
| 358,042 | Ketch | Feb. 22, 1887 |
| 599,500 | Gilman | Feb. 22, 1898 |
| 739,373 | Baird | Sept. 22, 1903 |
| 769,635 | Rankin | Sept. 6, 1904 |
| 783,771 | Anderson | Feb. 28, 1905 |
| 784,332 | Knight | Mar. 7, 1905 |
| 1,046,998 | Devey et al. | Dec. 10, 1912 |
| 1,459,271 | Von Engeln | June 19, 1923 |
| 1,797,107 | Veeder | Mar. 17, 1931 |
| 1,861,779 | Bornhauser | June 7, 1932 |
| 1,960,836 | Yander | May 29, 1934 |
| 2,095,385 | Heisserman | Oct. 12, 1937 |
| 2,224,442 | Mankoff | Dec. 10, 1940 |
| 2,478,733 | Wright | Aug. 9, 1949 |